May 4, 1965     T. DE FOREST     3,181,268
INSECT CATCHER
Filed Feb. 21, 1963
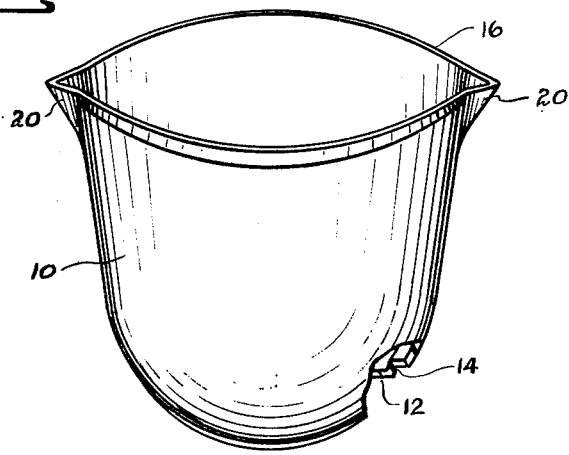
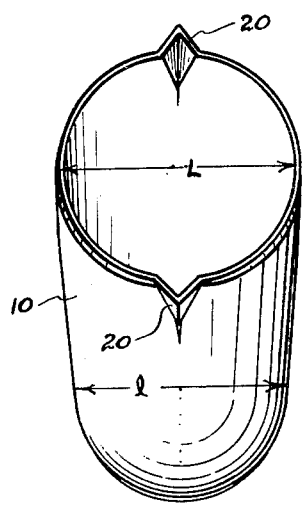
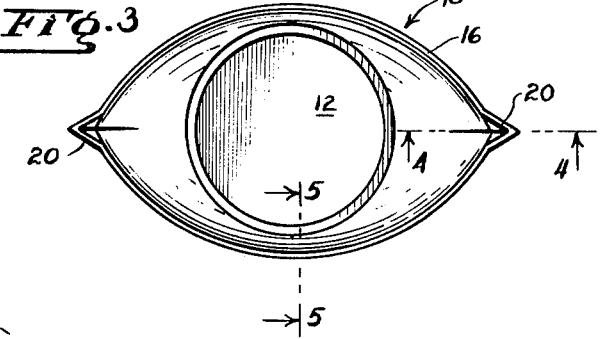
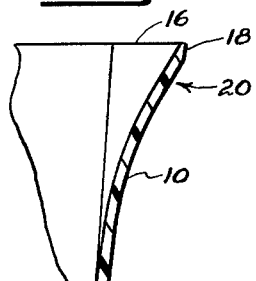
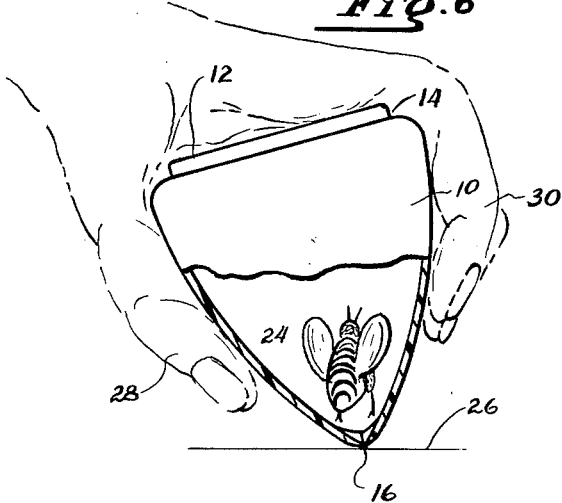
INVENTOR.
Tabor de Forest
BY Emery, Whittemore
Sandoe & Graham
ATTORNEYS

United States Patent Office 3,181,268
Patented May 4, 1965

3,181,268
INSECT CATCHER
Taber de Forest, P.O. Box 151, Chester, Conn.
Filed Feb. 21, 1963, Ser. No. 260,959
6 Claims. (Cl. 43—110)

This invention relates to devices for catching insects.

It is a common experience in automobiles to have a wasp or bee or other insect fly into the car and get behind the curved windshield. The insects seem unable to find their way out but they are a source of distraction to the driver and sometimes sting the driver.

It is an object of this invention to provide a simple and inexpensive catcher that can be used for removing insects from such locations. The invention comprises a cup-like receptacle which is made of plastic and which can be placed over the insect and then closed in such a way as to capture the insect without harming it. The catcher is then held outside the window of the car and permitted to open so that the insect will fly away.

Another object of the invention is to provide an insect catcher, of the character described, which can be used with one hand. Some features of the invention relate to the shape of the device for making it close at a sharp angle so as not to mash the insect, and other features relate to a construction which is economical to manufacture by molding.

Other objects, features and advantages of the invention will appear or be pointed out as the description proceeds.

In the drawing, forming a part hereof, in which like reference characters indicate corresponding parts in all the views;

FIGURE 1 is a perspective view, partly broken away and in section, showing an insect catcher made in accordance with this invention;

FIGURE 2 is a perspective view of the insect catcher shown in FIGURE 1 but viewed from a position at 90° to the view shown in FIGURE 1;

FIGURE 3 is a top plan view of the insect catcher shown in the other views;

FIGURES 4 and 5 are enlarged, fragmentary, sectional views taken on the line 4—4 and 5—5, respectively, of FIGURE 3; and FIGURE 6 is a view, partly in section, showing the way in which the insect catcher is used to catch an insect.

The insect catcher is of cup-like construction and has a side wall 10 and a bottom 12. The device is preferably made of flexible plastic material which returns to its original shape after being distorted. The bottom 12 is joined to the side wall at a step 14 in the preferred construction. This makes the bottom stiffer and facilitates the operation of the catcher; but it can be made with the side wall meeting the bottom without any shoulder or other stiffening.

The side wall 10 terminates at its upper end in a top edge 16 constructed with a tapered part 18, best shown in FIGURE 4, and there are permanently shaped spouts 20 at both sides of the device around the top edge 16. The surface of the tapered part 18 slopes at an angle of less than 10 degrees to the inside surface of the side of the cup.

The set imparted to the top edge by these spouts 20 gives the top edge 16 a generally elliptical contour around most of its periphery. This construction is best shown in FIGURE 3. In order to facilitate the manufacture of the device, the side wall 10 has a taper; that is, the side wall diverges at all locations around its periphery. This is obvious in FIGURE 1 and in FIGURE 2, where the divergence is less pronounced, the width of the catcher, indicated by the reference arrow L is somewhat larger than the corresponding dimension 1 at the lower portion of the side wall 10.

The material of which the catcher is made is preferably of substantially uniform thickness throughout the side wall 10 and the bottom 12, except near the upper end where the thickness decreases along the tapered portion 18. If the device is made by vacuum forming, instead of molding, there are differences in the thickness of the side wall at various locations, but it is important that the side wall have sufficient stiffness toward the edge 16 so that the side wall will close with an arched formation rather than have the sides collapse at the regions where the finger pressure is applied.

FIGURE 6 shows the way in which the catcher is used. This figure shows a bee 24 which has just been removed from a surface 26 of a windshield or other location. The catcher is first placed over the insect on the surface 26 and the edge 16 lies in a plane before there is any distortion of the side wall 10. FIGURE 4 shows the edge 16 to be a straight line; the shape of the edge being distorted by the perspective in FIGURES 1 and 2. However, if the surface 26 is curved in one direction, as is often the case with a windshield, the edge 16 will distort as necessary to make contact with the curved surface on which the insect is located.

After placing the catcher over the insect, the side wall 10 is pressed inwardly as shown by the illustration in FIGURE 6. In that view, one side of the wall 10 is pressed by the thumb 28 and the other side by fingers 30 of a person using the insect catcher. The pressure of the thumb and fingers is applied to the side wall 10 a short distance back from the edge 16. This causes the side wall to converge toward the edge 16 and to form an arched contour, as illustrated. The advantage of this operation is that the insect 24 is caught in the catcher without mashing or harming the insect.

The material of which the side wall is constructed is preferably translucent so that the person using the catcher can see the insect through the side wall. However, it is preferable not to have the side wall 10 transparent, that is, made of clear material, because many persons become nervous placing their fingers so close to a stinging insect where the insect is seen clearly through a transparent side wall 10.

The catcher is held closed, in the position shown in FIGURE 6, and moved outside of the car window or some other location where the insect can be released. The release is accomplished by merely relaxing the pressure of the thumb and fingers so that the side wall 10 returns at least part way to its original open condition. If the insect does not fly out voluntarily, the open catcher can be rapped against the side of the car or against any other object, or can be shaken sufficiently to eject the insect.

The depth of the catcher is coordinated with the size of the average human hand so that the bottom 12 is in a position to rest against the palm of the hand or the lower part of the fingers in order to provide a better grip on the catcher when it is being pressed inwardly by the tips of the thumb and fingers. Betters results are obtained if the pressure is applied some distance back from the edge 16 because this makes the edge on opposite sides of the device close more uniformly than when the pressure is applied more locally along the edge 16.

The preferred embodiment of the invention has been illustrated and described, but changes and modifications can be made, and some features can be used in different combinations without departing from the invention as defined in the claims.

What is claimed is:

1. An insect catcher comprising a cup having a relatively wide bottom and sides extending upwardly there-from and having a top edge with portions on opposite sides of the cup spaced apart from one another when in their normal positions, the cup being made of resilient material that can be distorted to bring the spaced portions of the top edge on opposite sides of the cup into substantial contact with one another along a line, the cup having two spouts, each of which is located at a different end of a diameter of the top end of the cup, the spouts being formed with sides consisting of portions of the top edge converging toward one another and meeting at an acute angle at the middle of the spout, the top edge at said middle of the spout being resilient enough to flex and bring the converging sides into generally parallel and substantially touching relation with one another when the sides of the cup are pressed together in directions normal to the diameter that extends from one spout to the other, and at an intermediate location along said diameter, said relatively wide bottom serving to hold the lower ends of the sides in spaced relation, the material of the cup being of sufficient resilience substantially to regain its undistorted shape after a distorting force is withdrawn.

2. The insect catcher described in claim 1 characterized by the cup being of a size to fit conveniently into the palm of one hand with the thumb against one side of the cup and the fingers of the hand against the other side of the cup, and the side of the cup being short enough so that the cup so held, the thumb and finger reach close to the top edge region of the cup for urging portions of the cup on opposite sides thereof into contact with one another.

3. The insect catcher described in claim 1 characterized by the sides of the cup terminating in a top edge portion, at least a part of the surface of which slopes at an acute angle to the inside surface of the cup.

4. The insect catcher described in claim 3 characterized by the end face of the side of the cup sloping toward the inside surface of the side of the cup at an acute angle less than 10°.

5. The insect catcher described in claim 1 characterized by the top edge being substantially as thin as the side of the cup below the top edge portion whereby pressure on the side of the cup produces a substantially uniform closing of the top of the cup along the full peripheral length of the top edge.

6. The insect catcher described in claim 5 characterized by the side wall being constructed of translucent plastic material but being sufficiently cloudy so that a person using the catcher avoids the sensation of touching the insect.

References Cited by the Examiner
UNITED STATES PATENTS

| | | | |
|---|---|---|---|
| 1,326,577 | 12/19 | Cullen | 43—137 |
| 1,507,968 | 9/24 | Johnson | 73—427 |
| 2,107,216 | 2/38 | Rogers | 206—41 X |
| 2,459,073 | 1/49 | Hamilton | 229—4.5 |
| 2,479,131 | 8/49 | Pari | 150—0.5 X |
| 2,983,467 | 5/61 | Retherford | 206—64 X |
| 3,063,487 | 11/62 | Mullin | 150—37 |

ABRAHAM G. STONE, *Primary Examiner.*